(12) United States Patent
Motal et al.

(10) Patent No.: US 6,682,711 B2
(45) Date of Patent: Jan. 27, 2004

(54) PROTECTION OF FISCHER-TROPSCH CATALYSTS FROM TRACES OF SULFUR

(75) Inventors: Robert J. Motal, San Ramon, CA (US); Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 09/842,673

(22) Filed: Apr. 27, 2001

(65) Prior Publication Data

US 2002/0187094 A1 Dec. 12, 2002

(51) Int. Cl.$^7$ ................................................. C10K 1/20
(52) U.S. Cl. .................. 423/244.09; 423/220; 423/230; 423/231; 423/244.1; 422/170; 422/171; 422/177; 422/190; 422/191; 422/193; 422/196; 518/705; 518/722; 518/728
(58) Field of Search .................... 422/170, 171, 422/177, 190, 191, 193, 196; 423/220, 230, 231, 244.09, 244.1; 518/705, 722, 728

(56) References Cited

U.S. PATENT DOCUMENTS

| | | | |
|---|---|---|---|
| 2,450,500 A | * 10/1948 | Clark ....................... 260/449.6 |
| 3,941,820 A | 3/1976 | Jackson et al. ........... 260/449.6 |
| 4,088,735 A | 5/1978 | Bratzler et al. ............. 423/219 |
| 4,312,741 A | 1/1982 | Jacquin .................. 208/11 LE |
| 4,539,334 A | 9/1985 | Murchison .................. 518/717 |
| 4,540,714 A | * 9/1985 | Pederson et al. ........... 518/714 |
| 4,624,968 A | 11/1986 | Kim et al. ................... 518/707 |
| 4,831,060 A | * 5/1989 | Stevens et al. ............. 518/714 |
| 4,857,559 A | 8/1989 | Eri et al. .................... 518/700 |
| 5,260,239 A | 11/1993 | Hsia ............................. 502/30 |
| 5,290,426 A | 3/1994 | Cody et al. .................. 208/27 |
| 5,384,336 A | 1/1995 | Koros ......................... 518/700 |
| 5,763,716 A | 6/1998 | Benham et al. ............. 585/315 |
| 5,827,902 A | 10/1998 | Maretto et al. ............. 518/706 |
| 5,882,614 A | 3/1999 | Taylor, Jr. et al. .......... 423/230 |
| 5,928,980 A | 7/1999 | Gangwal et al. ............. 502/20 |
| 5,968,465 A | 10/1999 | Koveal et al. .............. 423/236 |
| 6,103,206 A | 8/2000 | Taylor, Jr. et al. .......... 423/210 |

FOREIGN PATENT DOCUMENTS

| | | |
|---|---|---|
| GB | 2 375 770 A | 11/2002 |
| WO | 98/59019 A1 | 12/1998 |

OTHER PUBLICATIONS

Combined Search and Examination Report dated Jan. 7, 2003.

* cited by examiner

Primary Examiner—Stanley S. Silverman
Assistant Examiner—Timothy C. Vanoy
(74) Attorney, Agent, or Firm—Burns, Doane, Swecker & Mathis, L.L.P.

(57) ABSTRACT

Methods for removing sulfur from syngas in a Fischer-Tropsch reactor, and reactors including means for removing sulfur from syngas are disclosed. Sulfur-reactive metals can be used in the Fischer-Tropsch unit to sequester the sulfur. For example, the Fischer-Tropsch unit can be run in stages, using a sacrificial catalyst in a first stage to adsorb the sulfur. The Fischer-Tropsch reactor can include internal baffles that separate the reactor into zones, with a sacrificial catalyst in one or more of the zones, that can be easily sequestered and regenerated or replaced. Sulfur adsorbents can be placed in the inlet gas manifold. A portion of the Fischer-Tropsch catalyst can be converted into larger size pellets that do not fluidize with the finer grain Fischer-Tropsch catalyst and remain near the gas inlet where they adsorb and sequester the sulfur. These embodiments can be combined in any suitable manner to lower the sulfur concentration in the syngas feed. The resulting syngas feed preferably has a sulfur concentration less than 50 wppb, more preferably less than 15 wppb, and most preferably less than 1 wppb.

16 Claims, No Drawings

PROTECTION OF FISCHER-TROPSCH CATALYSTS FROM TRACES OF SULFUR

FIELD OF THE INVENTION

The present invention is in the field of Fischer-Tropsch synthesis, in removing trace sulfur from syngas feeds to Fischer-Tropsch reactors.

BACKGROUND OF THE INVENTION

Fischer-Tropsch synthesis can be used to convert natural gas to fuels. The process involves the initial conversion of a light hydrocarbon feed to syngas, and then conversion of the syngas to hydrocarbon products in a Fischer-Tropsch reactor. Fischer-Tropsch catalysts used to convert synthesis gas to hydrocarbons are poisoned by traces of sulfur. This is of particular concern in Fischer-Tropsch reactors that feature fluidized beds.

Numerous references have acknowledged the need to keep sulfur levels low in synthesis gas. For example, U.S. Pat. No. 5,968,465 teaches that the feed gas must be essentially free of sulfur, and defines "essentially free" as 10 wppm or less, preferably 5 wppm or less, more preferably, 1 wppm or less, and most preferably about 50 wppb. U.S. Pat. No. 5,882,614 teaches that the total sulfur should be less than 10 vppb. In rare cases, sulfur can be added to Fischer-Tropsch catalysts, but this causes a shift in product distribution to light products which in general are not as desirable as heavy products such as distillate fuels and lube base stocks.

Techniques for removing sulfur from syngas before Fischer-Tropsch synthesis are well known. They typically involve using a caustic solution (typically an amine) and adsorption on a support (typically a metal oxide, for example, zinc oxide). Examples of these techniques are described, for example, in U.S. Pat. Nos. 4,088,735 and 3,941,820.

The metals in Fischer-Tropsch catalysts strongly adsorb sulfur. Virtually every atom of sulfur that enters the reactor will attach to a catalytically active site and poison it. Lowering the concentration of sulfur in the syngas will significantly enhance the lifetime of the Fischer-Tropsch catalyst.

The following calculation shows the importance of removing sulfur from the syngas feed. Assuming the Fischer-Tropsch catalyst contains 20 wt % cobalt (3.39 micromoles/gram) and that 10% of the cobalt atoms exposed to the syngas are catalytically active and 90% of the atoms are not accessible to the syngas and are inactive, the amount of surface cobalt atoms is 0.339 micromoles/gram. With a syngas molar ratio of $2H_2$ per CO, a total CO rate of 1000 cc/g(cat)/h (3000 cc/g(cat)/h) and a syngas per-pass conversion is 60%, the GHSV of fresh syngas is 5000 cc/k(cat)/h. This is equivalent to 120,000 cc/g(cat)/day and 43,800,000 cc/g(cat)/year.

If a catalyst is considered inactive if 90% of the surface sites are destroyed, with 0.339 micromoles/g of surface sites, 0.305 micromoles must be destroyed for the catalyst to be inactive. Based on lab studies, each sulfur atom deactivates approximately six surface cobalt atoms, so only 0.0509 micromoles/g of sulfur is needed to deactivate this typical catalyst.

If the sulfur in the syngas is present as hydrogen sulfide at 1 part per billion by weight, with a syngas density of 10.67 g/mole and an $H_2S$ density of 34 g/mol, 1 part per billion of sulfur (as $H_2S$) is equivalent to 0.31 parts per billion by volume. With the GHSV of the fresh syngas above, the equivalent $H_2S$ GHSV are shown below.

| GHSV rate of total syngas | $H_2S$ GHSV at 1 wppm | $H_2S$ molar rate at 1 wppm |
|---|---|---|
| 5000 cc/g(cat)/h | 1.57e-06 cc/g(cat)/h | |
| 120,000 cc/g(cat)/day | 3.76e-05 cc/g(cat)/day | |
| 43,800,000 cc/g(cat)/year | 1.37e-02 cc/g(cat)/year | 0.00061 micromoles/g-yr |

Accordingly, if the catalyst can adsorb 0.0509 micromoles of sulfur before becoming inactive, it will last approximately 83 years. The following table correlates the catalyst life and the feed sulfur levels using the above assumptions.

| Feed Sulfur Level | Catalyst life |
|---|---|
| 1 ppb | 83 years |
| 15 ppb | 6 years |
| 50 ppb | 20 months |
| 1 ppm | 1 month |
| 50 ppm | 1 day |

In general, it is desirable to have the Fischer-Tropsch catalyst last as long as possible. 1 year life is unacceptable, and lives approximately of 5 years or greater are needed for acceptable use. This requires that the feed sulfur be consistently below an approximate maximum of 20 ppbw.

U.S. Pat. No. 5,968,465 specifies that the feed sulfur should be below 50 wppb, which may not be acceptable for some catalysts. U.S. Pat. No. 5,882,614 teaches that the syngas to the FT unit should be below 10 ppmv, but achieves this level by treating the feed to the upstream syngas generation unit. This method is not totally reliable, and other methods to reaching low levels of sulfur in syngas are needed.

It is impossible to completely eliminate all sulfur from the feed, and some contamination is inevitable. However, since the Fischer-Tropsch catalysts and processes are valuable, it would be desirable to have methods for keeping sulfur levels as low as possible. It would be advantageous to provide methods for improving the ability of a syngas conversion facility to tolerate sulfur in the Fischer-Tropsch section. The present invention provides such methods.

SUMMARY OF THE INVENTION

Methods for removing sulfur from syngas in a Fischer-Tropsch reactor, and reactors including means for removing sulfur from syngas are disclosed.

The present invention provides an apparatus for a Fischer-Tropsch process comprising: a gas inlet for conducting an inlet gas stream, and at least one product outlet with a reactor there between including a Fischer-Tropsch catalyst, the reactor operable at temperatures of from 175° to 325° C., and a pressure from 1 to 20 atmospheres, and a material, included within the inlet gas stream and upstream from the catalyst, capable of binding sulfur contained in the inlet gas stream. Trace amounts of sulfur can be removed by this method.

In one embodiment, sulfur-reactive metals are used in the Fischer-Tropsch unit to sequester the sulfur. This can be accomplished in several ways. For example, the Fischer- Tropsch unit can be run in stages. The first stage will adsorb all the sulfur and only the catalyst in this unit will need to be changed. The catalyst in this unit can be made in a less expensive form than the catalysts in later stages. For example, iron can be used as the catalyst in the first stage, and more expensive cobalt and/or ruthenium used in later stages. The catalysts in the latter stages will still age slowly by other mechanisms (e.g. metal sintering, forming alloys between the metal and the support). Portions of the aging catalysts in the latter beds can be routed to the first bed to act as a sulfur trap. Preferably, the Fischer-Tropsch catalyst in the first reactor is less active than the catalysts in the later beds. Since the Fischer-Tropsch reaction is highly exothermic, it is most difficult to control in the early stages of the reaction when a large amount of reactive syngas is still present. Once part of the syngas has been consumed, and the partial pressure of reactants has been reduced, the reaction is easier to control. Accordingly, having a less active partially sulfur-poisoned catalyst in the first bed improves the ability to control the overall process.

In another embodiment, the Fischer-Tropsch reactor includes internal baffles that separate the reactor into zones. For example, the zones can be arrayed in concentric circles, with catalysts sequestered into each zone, and reactants routed from one zone to the other.

In a third embodiment, sulfur adsorbents are placed in the inlet gas manifold. These adsorbents can be inexpensive metals that have a great affinity for adsorption of sulfur (molybdenum, zinc, lead, etc.) but which do not alter the syngas substantially (little activity for coke formation, water gas shift reaction, methanol synthesis, or Fischer-Tropsch synthesis.)

In a fourth embodiment, part of the Fischer-Tropsch catalyst is converted into larger size pellets. These will not fluidize with the finer grain Fischer-Tropsch catalyst and will remain near the gas inlet where they will act to adsorb and sequester the sulfur. These larger size pellets can be separated from the finer grain material using a simple sieving device. The large pellets can be made from a Fischer-Tropsch catalyst that does not quite meet specifications and which would otherwise have to be reprocessed. The larger pellets can also include a non-Fischer-Tropsch active metal that has a high affinity for sulfur.

These embodiments can be combined in any suitable manner to lower the sulfur concentration in the syngas feed. The resulting syngas feed preferably has a sulfur concentration less than 50 wppb, more preferably less than 15 wppb, and most preferably less than 1 wppb.

DETAILED DESCRIPTION OF THE INVENTION

Methods for removing sulfur from syngas in a Fischer-Tropsch reactor, and reactors including means for removing sulfur from syngas are disclosed. Various embodiments are described. These embodiments can be combined in any suitable manner to lower the sulfur concentration in the syngas feed.

The syngas feed generally contains at least 50 wppb sulfur, and is usually in the range of from 50 to 500 wppb sulfur, before being desulfurized using the methods described herein. The methods typically lower the sulfur concentration to less than 50 wppb sulfur, preferably less than 15 wppb sulfur, and most preferably less than 1 wppb sulfur before being used in Fischer-Tropsch synthesis, i.e., before it is sent to the main catalyst bed.

Definition of Terms

Sacrificial Fischer-Tropsch Catalyst: A catalyst which is lower cost when compared to other Fischer-Tropsch catalysts but is capable of conducting the Fischer-Tropsch reaction and is capable of adsorbing sulfur. This also includes the use of Fischer-Tropsch catalysts having a diminished activity for the Fischer-Tropsch reaction such that it can be considered sacrificial, i.e., at the end of a normal useful catalyst lifetime, but still capable of adsorbing sulfur. It can also include iron-based Fischer-Tropsch catalysts which are less expensive than cobalt-based catalysts but have unacceptable methane selectivities when operated at high conversion. Lower cost Fischer-Tropsch catalysts can also be conventional Fischer-Tropsch catalysts but with lower levels of metals, especially lower levels of Platinum Group Metals.

Platinum Group Metals: This group includes Ru, Pt, Pd, Os, Rh, and Ir.

Cobalt-Based Fischer-Tropsch Catalysts: These catalysts include cobalt, preferably greater than 5 wt %, more preferably greater than 10 wt %, most preferably greater than 20 wt %. In addition, ruthenium may be present in amounts above 100 wppm.

The term "hydrogenation" as used herein includes any of the following processes: hydrotreating, hydrocracking, saturation, hydroisomerization, hydrofinishing, hydrodewaxing, and the like. It can be used on the carbon-containing products or the hydrocarbon feedstock.

Light hydrocarbon feedstock: These feedstocks include principally methane, ethane, propane, butane and mixtures thereof. In addition, carbon dioxide, carbon monoxide, ethylene, propylene and butenes may be present.

Fischer-Tropsch Synthesis

Before discussing methods for lowering the sulfur-concentration of syngas used in Fischer-Tropsch synthesis, the following description of feedstocks for syngas formation, syngas formation, and Fischer-Tropsch synthesis is provided.

Feedstocks for Syngas Formation

Light hydrocarbon feedstocks are commonly used to form syngas. Typically, these feedstocks predominantly include methane, but other light hydrocarbons can be used. Natural gas is an example of a light hydrocarbon feed. In addition to methane, natural gas includes some heavier hydrocarbons (mostly $C_2+$, paraffins) and other impurities, e.g., mercaptans and other sulfur-containing compounds, carbon dioxide, nitrogen, helium, water and non-hydrocarbon acid gases. Natural gas fields may also typically contain a significant amount of $C_5+$ material, which is liquid at ambient conditions.

The methane, and optionally ethane and/or other hydrocarbons can be isolated and used to generate syngas. Various other impurities can be readily separated. Inert impurities such as nitrogen and helium can be tolerated. The methane in the natural gas can be isolated, for example in a demethanizer, and then desulfurized and sent to a syngas generator.

Heteroatom Removal

The light hydrocarbon feed used in the syngas generation may include sulfur-containing compounds that adversely affect the syngas generation and/or hydrocarbon synthesis catalysts. Accordingly, such impurities must be removed before the syngas generation step.

Methods for removing the bulk of sulfur and nitrogen impurities are well known to those of skill in the art, and include, for example, extraction with a amine-containing solution, extractive Merox (mercaptan oxidation), hydrotreating, adsorption, etc. Extraction with amine-containing solutions is the preferred method of removing hydrogen sulfide and other base-soluble sulfur compounds. Hydrotreating is the preferred means for removing the majority of higher molecular weight sulfur species by first converting them to more readily extracted hydrogen sulfide. ZnO guard beds have also been used to remove sulfur impurities.

Other feed pretreatment steps may include passing the feed as a liquid through a sulfur sorber containing, for example, nickel oxide or copper oxide on a support and drying the feed using molecular sieves.

These steps significantly lower the sulfur concentration. They can be combined, e.g. extraction with an amine-containing solution followed by adsorption with a ZnO guard bed. However, the methods described herein provide for even lower sulfur concentrations, thus extending the life of the Fischer-Tropsch catalysts.

Hydrotreating

Light hydrocarbon feeds can be desulfurized before being sent through the syngas generator to significantly lower the sulfur concentration, typically to about 100 wppb or so. Hydrotreatment catalysts and conditions are well known to those of skill in the art. Hydrotreating converts various sulfur compounds to hydrogen sulfide, which is easier to remove by caustic extraction. If all the sulfur in the feedstock is in the form of hydrogen sulfide, hydrotreating will not be necessary.

Catalysts useful for hydrotreating light hydrocarbon fractions are well known in the art. See, for example, U.S. Pat. Nos. 4,347,121 and 4,810,357 for general descriptions of hydrotreating catalysts and conditions. Suitable catalysts include noble metals from Group VIII, such as platinum or palladium on an alumina or siliceous matrix, and Group VIII and Group VI metals, such as nickel-molybdenum or nickel-tin on an alumina or siliceous matrix. U.S. Pat. No. 3,852,207 describes suitable noble metal catalysts and mild hydrotreating conditions. Other suitable catalysts are described, for example, in U.S. Pat. Nos. 4,157,294 and 3,904,513. The contents of these patents are hereby incorporated by reference.

The non-noble (such as nickel-molybdenum) hydrogenation metal is usually present in the final catalyst composition as an oxide or, more preferably, as a sulfide, when such compounds are readily formed from the particular metal involved. Preferred non-noble metal catalyst compositions contain in excess of about 5 weight percent, preferably about 5 to about 40 weight percent, molybdenum and/or tungsten, and at least about 0.5, preferably about 1 to about 15 weight percent of nickel and/or cobalt determined as the corresponding oxides. The noble metal (such as platinum) catalyst contains in excess of about 0.01 percent metal, preferably between about 0.1 and about 1.0 percent metal. Combinations of noble metals may also be used, such as mixtures of platinum and palladium.

Syngas

The light hydrocarbon feed and an oxidant are sent through a conventional syngas generator to provide synthesis gas, which includes primarily hydrogen and carbon monoxide. The syngas can also include nitrogen and minor amounts of carbon dioxide, water, unconverted light hydrocarbon feedstock and/or various other impurities. The presence of sulfur, nitrogen, halogen, selenium, phosphorus and arsenic contaminants in the syngas is undesirable.

If the synthesis gas contains traces of cyanides, these traces can be removed using techniques known to those of skill in the art, and described, for example, in U.S. Pat. No. 5,968,465, the contents of which are hereby incorporated by reference for all purposes.

Fischer-Tropsch Synthesis

The Fischer-Tropsch reaction may be effected in a fixed bed, in a slurry bed, or in a fluidized bed reactor. The Fischer-Tropsch reaction conditions may include using a reaction temperature of between 190° C. and 340° C., with the actual reaction temperature being largely determined by the reactor configuration. Thus, when a fluidized bed reactor is used, the reaction temperature is preferably between 300° C. and 340° C.; when a fixed bed reactor is used, the reaction temperature is preferably between 200° C. and 250° C.; and when a slurry bed reactor is used, the reaction temperature is preferably between 190° C. and 270° C.

An inlet synthesis gas pressure to the Fischer-Tropsch reactor of between 1 and 50 bar, preferably between 15 and 50 bar, may be used. The synthesis gas may have a $H_2$:CO molar ratio, in the fresh feed, of 1.5:1 to 2.5:1, preferably 1.8:1 to 2.2:1. The synthesis gas typically includes 0.1 wppm of sulfur or less. A gas recycle may optionally be employed to the reaction stage, and the ratio of the gas recycle rate to the fresh synthesis gas feed rate, on a molar basis, may then be between 1:1 and 3:1, preferably between 1.5:1 and 2.5:1. A space velocity, in $m^3$ (kg catalyst)$^{-1}$ hr$^{-1}$, of from 1 to 20, preferably from 8 to 12, may be used in the reaction stage.

In principle, an iron-based, a cobalt-based or an iron/cobalt-based Fischer-Tropsch catalyst can be used in the Fischer-Tropsch reaction stage, although Fischer-Tropsch catalysts operated with high chain growth probabilities (i.e., alpha values of 0.8 or greater, preferably 0.9 or greater, more preferably, 0.925 or greater) are preferred. Reaction conditions are preferably chosen to minimize methane and ethane formation. This tends to provide product streams which mostly include wax and heavy products, i.e., largely paraffinic $C_{20}$+ linear hydrocarbons.

The iron-based Fischer-Tropsch catalyst may include iron and/or iron oxides which have been precipitated or fused. However, iron and/or iron oxides which have been sintered, cemented, or impregnated onto a suitable support can also be used. The iron should be reduced to metallic Fe before the Fischer-Tropsch synthesis. The iron-based catalyst may contain various levels of promoters, the role of which may be to alter one or more of the activity, the stability, and the selectivity of the final catalyst.

Preferred promoters are those influencing the surface area of the reduced iron ("structural promoters"), and these include oxides or metals of Mn, Ti, Mg, Cr, Ca, Si, Al, or Cu or combinations thereof.

The products from Fischer-Tropsch reactions often include a gaseous reaction product and a liquid reaction product. The gaseous reaction product includes hydrocarbons boiling below about 343° C. (e.g., tail gases through middle distillates). The liquid reaction product (the condensate fraction) includes hydrocarbons boiling above about 343° C. (e.g., vacuum gas oil through heavy paraffins).

Sulfur Removal

The methods generally involve taking a Fischer-Tropsch reactor that includes a gas inlet, at least one product outlet, and a Fischer-Tropsch catalyst, and including within the inlet gas stream and upstream from the catalyst a material capable of binding trace amounts of sulfur in the inlet gas. The material is used to bind sulfur in the syngas feed, thus preserving catalyst life. There are many suitable materials, examples of which are described in more detail below. The materials can be within the reactor and upstream from the catalyst. Alternatively, the materials can be located within a section of the gas inlet contacting the reactor.

The reactors preferably include a means for removing the sulfur binding material when its performance is diminished and replacing it with fresh sulfur binding material. Alternatively, the reactor can include a means for separating the Fischer-Tropsch catalyst while retaining the sulfur binding material. Suitable means for separation include a screen, gravity settling apparatus, hydrocyclone, magnetic separator, a fluidized apparatus and combinations thereof Embodiment 1

In a first embodiment sulfur-reactive metals are used in the Fischer-Tropsch unit to sequester the sulfur. One method for performing this is to run the Fischer-Tropsch unit in stages. A first stage adsorbs or converts all the sulfur and only the catalyst in this unit will need to be changed.

In the embodiments below where the Fischer-Tropsch catalyst is located in a plurality of catalyst beds, the catalyst bed adjacent to the gas inlet includes the material capable of binding trace amounts of sulfur in the inlet gas. The catalyst in the catalyst bed adjacent to the gas inlet is preferably a sacrificial Fischer-Tropsch catalyst. When the sulfur-binding material is a Fischer-Tropsch catalyst, it is preferably capable of catalyzing the Fischer-Tropsch reaction at a weight-based conversion level less than 80% of the next bed, preferably less than 60%, and most preferably less than 40%.

Examples of suitable sacrificial Fischer-Tropsch catalysts include Fischer-Tropsch catalysts having a negligible platinum group metal content, Fischer-Tropsch catalysts having a negligible cobalt content (<10%, preferably <5%), substantially deactivated Fischer-Tropsch catalyst, and mixtures thereof.

In a preferred embodiment, the first reactor uses a relatively inexpensive sacrificial catalyst, for example, an iron catalyst, and the second reactor uses a relatively expensive catalyst, for example, one including cobalt and/or ruthenium. Preferably, the Fischer-Tropsch reactor includes an iron-based catalyst adjacent to the inlet, and upstream of a cobalt-based catalyst. Accordingly, the first (inexpensive) catalyst becomes poisoned by sulfur in the Fischer-Tropsch feed, preserving the second (expensive) catalyst.

In another embodiment the gas is capable of passing through at least two separate iron-based catalyst beds, with the beds alternating between sulfur removal and catalyst changeout.

The first and second catalysts can both be operated with high chain growth probabilities, or, alternatively, the first catalyst can be operated with low chain growth probabilities and the second catalyst is operated with high chain growth probabilities.

The catalysts in the later stage(s) will still age slowly by other mechanisms (metal sintering, forming alloys between the metal and the support). Portions of the aging catalysts in the latter beds can be routed to the first bed to act as a sulfur trap. Preferably, the Fischer-Tropsch catalyst in the first reactor is less active than the catalysts in the later beds. Since the Fischer-Tropsch reaction is highly exothermic, it is most difficult to control in the early stages of the reaction when a large amount of reactive syngas is still present. Once part of the syngas has been consumed, and the partial pressure of reactants has been reduced, the reaction is easier to control. Accordingly, having a less active partially sulfur-poisoned catalyst in the first bed improves the ability to control the overall process.

In one embodiment, the first catalyst is regenerated periodically, for example, every six months. Periodic catalyst regeneration helps to maintain low levels of sulfur in the feed to the second Fischer-Tropsch reactor. Catalysts poisoned by sulfur generally must be decomposed to the elements, the elements purified from sulfur, and then rebuilt as a catalyst. Accordingly, it is important that the catalyst in the main catalyst beds are not contaminated, only the catalysts in the first (sacrificial) bed.

Embodiment 2

In a second embodiment, the Fischer-Tropsch reactor includes internal baffles that separate the reactor into zones. For example, the zones can be arrayed in concentric circles, with catalysts sequestered into each zone, and reactants routed from one zone to the other. In this manner, catalysts in one zone can be regenerated (either in situ, or after removal) while other zones are running, minimizing down time. The catalyst could also be removed and replaced with fresh catalyst.

Embodiment 3

In a third embodiment, sulfur adsorbents are placed in the inlet gas manifold. These adsorbents are preferably inexpensive metals that have a great affinity for adsorption of sulfur but that do not alter the syngas substantially. The sulfur binding material can include cobalt, iron, molybdenum, tungsten, zinc, nickel, vanadium, cadmium, rhenium, manganese, lead, silver, arsenic, chromium, antimony, oxides thereof, alloys thereof and mixtures thereof. Preferred adsorbents include nickel, molybdenum, zinc, lead, copper, oxides thereof, alloys thereof and mixtures thereof. Preferably, the adsorbents have little activity for coke formation, water gas shift reaction, methanol synthesis, or Fischer-Tropsch synthesis.

In one embodiment the sulfur adsorbent is CuO. When a syngas feed is passed over CuO at relatively moderate temperatures (about 300° C.), CuS is formed, thus desulfurizing the feed. The use of CuO as a sulfur adsorbent, albeit for different feeds, is described, for example, in U.S. Pat. No. 4,456,527, the contents of which are hereby incorporated by reference for all purposes.

Substantially sulfur-free feed can be obtained by first hydrotreating the feed to bring its sulfur content below 100 wppb and then using a sulfur converter/sorber as described in U.S. Pat. No. 5,059,304, the contents of which are hereby incorporated by reference for all purposes. Hydrotreating converts essentially all the sulfur into hydrogen sulfide, which is easier to remove than the organic sulfur components. Hydrotreating is preferred for $C_5+$ hydrocarbons.

Embodiment 4

In a fourth embodiment, part of the Fischer-Tropsch catalyst is converted into larger size pellets. The larger pellets have a higher settling velocity than the Fischer-Tropsch catalyst, and preferentially reside near the gas inlet of the Fischer-Tropsch reactor. The larger pellets do not fluidize with the finer grain Fischer-Tropsch catalyst and will remain near the gas inlet where they will act to adsorb and sequester the sulfur. These larger size pellets can be separated from the finer grain material using a simple sieving device or other suitable removal means, and readily replaced when they have become inactive.

Large pellets can be formed from Fischer-Tropsch catalyst particles that do not meet specifications and which would otherwise have to be reprocessed. The larger pellets can also include a non-Fischer-Tropsch active metal that has a high affinity for sulfur, such as those described above in Embodiment 3.

While the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. An apparatus for a Fischer-Tropsch process comprising: a gas inlet, for conducting an inlet gas stream, and at least one product outlet with a reactor there between including a second Fischer-Tropsch catalyst, the reactor operable at temperatures of from 175° to 325° C., and a pressure from 1 to 20 atmospheres, and a sacrificial Fischer-Tropsch catalyst selected from the group consisting of Fischer-Tropsch catalysts having a negligible platinum group metal content, Fischer-Tropsch catalysts having a negligible cobalt content, iron-based Fischer-Tropsch catalysts and substantially deactivated Fischer-Tropsch catalysts, included within the inlet gas stream and upstream from the second Fischer-Tropsch catalyst, wherein the sacrificed Fischer-Tropsch catalyst is present to bind sulfur contained in the inlet gas stream.

2. The apparatus according to claim 1 wherein the sacrificial Fischer-Tropsch catalyst is within the reactor and upstream from the second Fischer-Tropsch catalyst.

3. The apparatus according to claim 2 wherein the second Fischer-Tropsch catalyst is located in a plurality of catalyst beds, and further wherein the catalyst bed adjacent to the gas inlet includes the sacrificial Fischer-Tropsch catalyst capable of binding sulfur in the inlet gas.

4. The apparatus according to claim 1 wherein the sacrificial Fischer-Tropsch catalyst is located within a section of the gas inlet.

5. The apparatus according to claim 1 wherein the sacrificial Fischer-Tropsch catalyst is capable of catalyzing the Fischer-Tropsch reaction at a weight based conversion level less than 80% of the second Fischer-Tropsch catalyst of claim 1.

6. The apparatus according to claim 1 wherein the sacrificial Fischer-Tropsch catalyst is capable of catalyzing the Fischer-Tropsch reaction at a weight based conversion level less than 60% of the second Fischer-Tropsch catalyst of claim 1.

7. The apparatus according to claim 1 wherein the sacrificial Fischer-Tropsch catalyst is capable of catalyzing the Fischer-Tropsch reaction at a weight based conversion level less than 40% of the second Fischer-Tropsch catalyst of claim 1.

8. The apparatus according to claim 1 wherein the sacrificial Fischer-Tropsch catalyst is a Fischer-Tropsch catalyst which contains less than 10% cobalt.

9. The apparatus according to claim 1 wherein the Fischer-Tropsch reactor includes an iron-based sacrificial Fischer-Tropsch catalyst adjacent to the inlet, and upstream of a second Fischer-Tropsch cobalt-based catalyst.

10. The apparatus according to claim 9 wherein the gas is capable of passing through at least two separate iron-based catalyst beds, said beds alternating between sulfur removal and catalyst changeout.

11. The apparatus according to claim 1 including means for removing the sacrificial Fischer-Tropsch catalyst when its performance is diminished and replacing it with fresh sacrificial Fischer-Tropsch catalyst.

12. The apparatus according to claim 1 wherein the sacrificial Fischer-Tropsch catalyst is present in the form of particles that have a higher settling velocity than the second Fischer-Tropsch catalyst wherein said sacrificial Fischer-Tropsch catalyst preferentially resides adjacent to the gas inlet.

13. The apparatus according to claim 12 further comprising means for separating the second Fischer-Tropsch catalyst while retaining the sacrificial Fischer-Tropsch catalyst.

14. The apparatus according to claim 13 wherein the means for separating is selected from the group consisting of a screen, a gravity settling apparatus, a hydrocyclone, a magnetic separator, a fluidized apparatus and combinations thereof.

15. A process for removing sulfur from a synthesis gas in a Fischer-Tropsch reactor that includes:

i) a gas inlet for conducting an inlet gas stream;

ii) at least one product outlet, and iii) a second Fischer-Tropsch catalyst;

the process comprising:

a) placing a sacrificial Fischer-Tropsch catalyst selected from the group consisting of Fischer-Tropsch catalysts having a negligible platinum group metal content, Fischer-Tropsch catalysts having a negligible cobalt content, iron-based Fischer-Tropsch catalysts and substantially deactivated Fischer-Tropsch catalyst, within the inlet gas stream and upstream from the second Fischer-Tropsch catalyst, wherein the sacrificial Fischer-Tropsch catalyst is present to bind sulfur contained in synthesis gas; and b) passing a sulfur-containing synthesis gas over the sacrificial Fischer-Tropsch catalyst, thereby removing at least a portion of the sulfur contained in the synthesis gas prior to introducing the synthesis gas to the second Fischer-Tropsch catalyst.

16. An apparatus for a Fischer-Tropsch process comprising: a gas inlet, for conducting an inlet gas stream, and at least one product outlet with a reactor there between, the reactor containing a second Fischer-Tropsch catalyst selected from the group consisting of an iron-based catalyst, a cobalt-based catalyst, a ruthenium-based catalyst and combinations thereof, the reactor operable at temperatures of from 175° to 325° C. and a pressure from 1 to 20 atmospheres, and a sacrificial Fischer-Tropsch catalyst, included within the inlet gas stream and upstream from the second Fischer-Tropsch catalyst, wherein the sacrificial Fischer-Tropsch catalyst is present to bind sulfur contained in the inlet gas stream, wherein the sacrificial Fischer-Tropsch catalyst is selected from the group consisting of iron-based catalysts, catalysts having a negligible platinum content, catalysts having a negligible cobalt content, substantially deactivated Fischer-Tropsch catalysts and mixtures thereof.

* * * * *